(12) United States Patent
Lin

(10) Patent No.: US 7,543,408 B2
(45) Date of Patent: Jun. 9, 2009

(54) INSECT-CATCHER

(75) Inventor: Heng-Yuan Lin, Banciao (TW)

(73) Assignee: Well Electronics Co., Ltd., Banciao, Taipei Hsien (TW)

( * ) Notice: Subject to any disclaimer, the term of this patent is extended or adjusted under 35 U.S.C. 154(b) by 291 days.

(21) Appl. No.: 11/549,634

(22) Filed: Oct. 13, 2006

(65) Prior Publication Data

US 2008/0090189 A1 Apr. 17, 2008

(51) Int. Cl.
*A01M 1/22* (2006.01)
*A01M 1/04* (2006.01)

(52) U.S. Cl. .......................................... 43/112; 43/113
(58) Field of Classification Search .................. 43/112, 43/113
See application file for complete search history.

(56) References Cited

U.S. PATENT DOCUMENTS

| | | | | |
|---|---|---|---|---|
| 2,475,182 A | * | 7/1949 | Gardenhour | 43/112 |
| 3,998,000 A | * | 12/1976 | Gilbert | 43/112 |
| 4,852,296 A | * | 8/1989 | Swanson et al. | 43/112 |
| 6,560,918 B2 | * | 5/2003 | Nelson | 43/112 |
| 6,568,124 B1 | * | 5/2003 | Wilbanks | 43/112 |
| 6,688,035 B1 | * | 2/2004 | Shichman | 43/112 |

* cited by examiner

*Primary Examiner*—Kurt Rowan
(74) *Attorney, Agent, or Firm*—patenttm.us

(57) ABSTRACT

An insect-catcher has a frame, a cover and a gathering base. The frame has an open top and a bottom. The top has at least one key mounted on the edge of the open top and protruding from the open top. The cover detachably covers the open top of the frame and has at least one light tube, a high-voltage net and at least one safety switch. Each safety switch has an activating lever aligning with the keyway and pressing against one key. The gathering base detachably connects to the bottom of the frame. The activating lever disengages from the key and turns off the high-voltage net when the cover separates from the frame so people will not get hurt.

3 Claims, 4 Drawing Sheets

INSECT-CATCHER

BACKGROUND OF THE INVENTION

1. Field of Invention

The present invention relates to an insect-catcher, and more particularly to an insect-catcher that has a detachable gathering base and is safe to prevent users from injuring.

2. Description of the Related Art

A conventional insect-catcher has a frame, a detachable cover and a gathering base. The frame has a shape, an open top and a bottom. The bottom may have a threaded outer edge when the shape of the frame is circular. The cover is mounted on the top of the frame and has an inner surface, at least one light tube, a high-voltage net, an electrical wire and a switch. The light tube is mounted on the inner surface. The high-voltage net is mounted on the inner surface of the cover and extends in the frame and near the bottom of the frame. The electrical wire connects the light tube and the high-voltage net to a power source to provide electricity to light the light tube and produce high voltage in the high-voltage net. The switch controls whether electricity passes into the light tube and high-voltage net via electrical wire or not. The gathering base connects to the bottom of the frame to gather caught insects and has a shape and an inner edge. The shape of the gathering base corresponds to the shape of the frame. The inner edge may be threaded to connect to threaded outer edge of the frame detachably when the shape of the frame and the gathering base is circular.

However, only when the frame and the gathering base are circular, the gathering base disengages from the frame and users can clean the remains of insects. If the shapes of the frame and the gathering base are non-circular, the gathering base is not detachable. Users have to tilt the insect-catcher to pour out the caught insects. Thus, the conventional insect-catcher is inconvenient for users.

Moreover, when the cover disengages from the frame, the electrical wire may still connect to the power source, so the light tube is brightened and the high-voltage net has high-voltage electricity passing. Users may touch the high-voltage net to get hurt. Thus, the conventional insect-catcher is not safe for users.

To overcome the shortcomings, the present invention provides insect-catcher to mitigate or obviate the aforementioned.

SUMMARY OF THE INVENTION

The primary objective of the present invention is to provide an insect-catcher that has a detachable gathering base and is safe to prevent users from injuring.

To achieve the objective, the insect-catcher in accordance with the present invention has a frame, a cover and a gathering base. The frame has an open top and a bottom. The open top has at least one key. The at least one key is mounted on the edge of the open top and protrudes from the top. The cover detachably covers the top of the frame and has at least one light tube, a high-voltage net, at least one keyway and at least one safety switch. The at least one keyway respectively receives the at least one key. Each safety switch is mounted in the cover and has an activating lever. The activating lever aligns with the keyway and selectively presses against by one key. The gathering base detachably connects to the bottom of the frame.

Electricity can pass the light tube and the high-voltage net only when the cover securely covers the frame and the key extends through the keyway to press against one of the activating lever and allow the activating lever to contact the safety switch. Thus, when the cover disengages from and the frame, electricity does not pass the high-voltage net and users will not get hurt.

Other objectives, advantages and novel features of the invention will become more apparent from the following detailed description when taken in conjunction with the accompanying drawings.

DETAILED DESCRIPTION OF THE INVENTION

Figure 1:
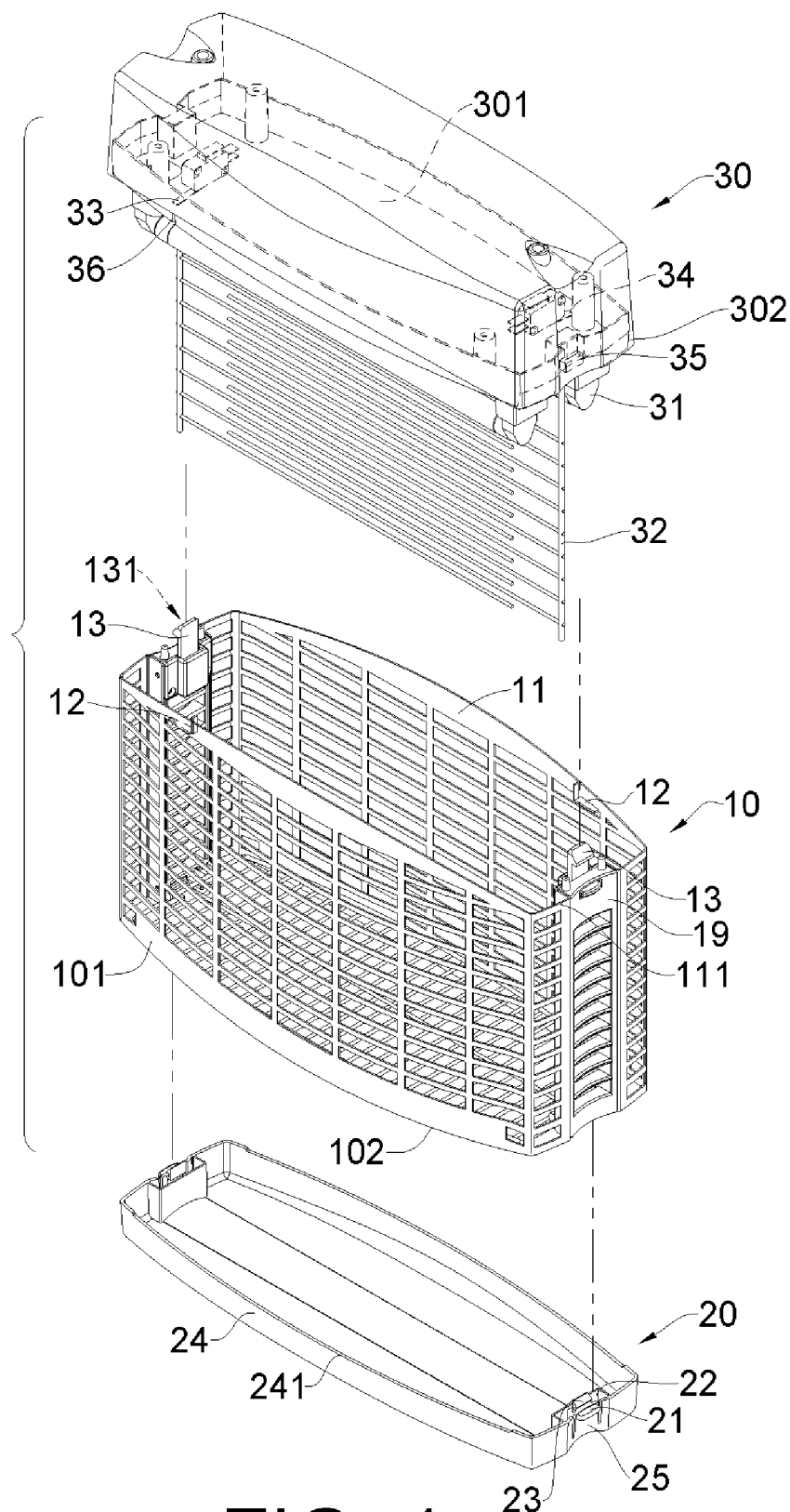
FIG. 1 is an exploded perspective view of an insect-catcher in accordance with the present invention.
Figure 2:
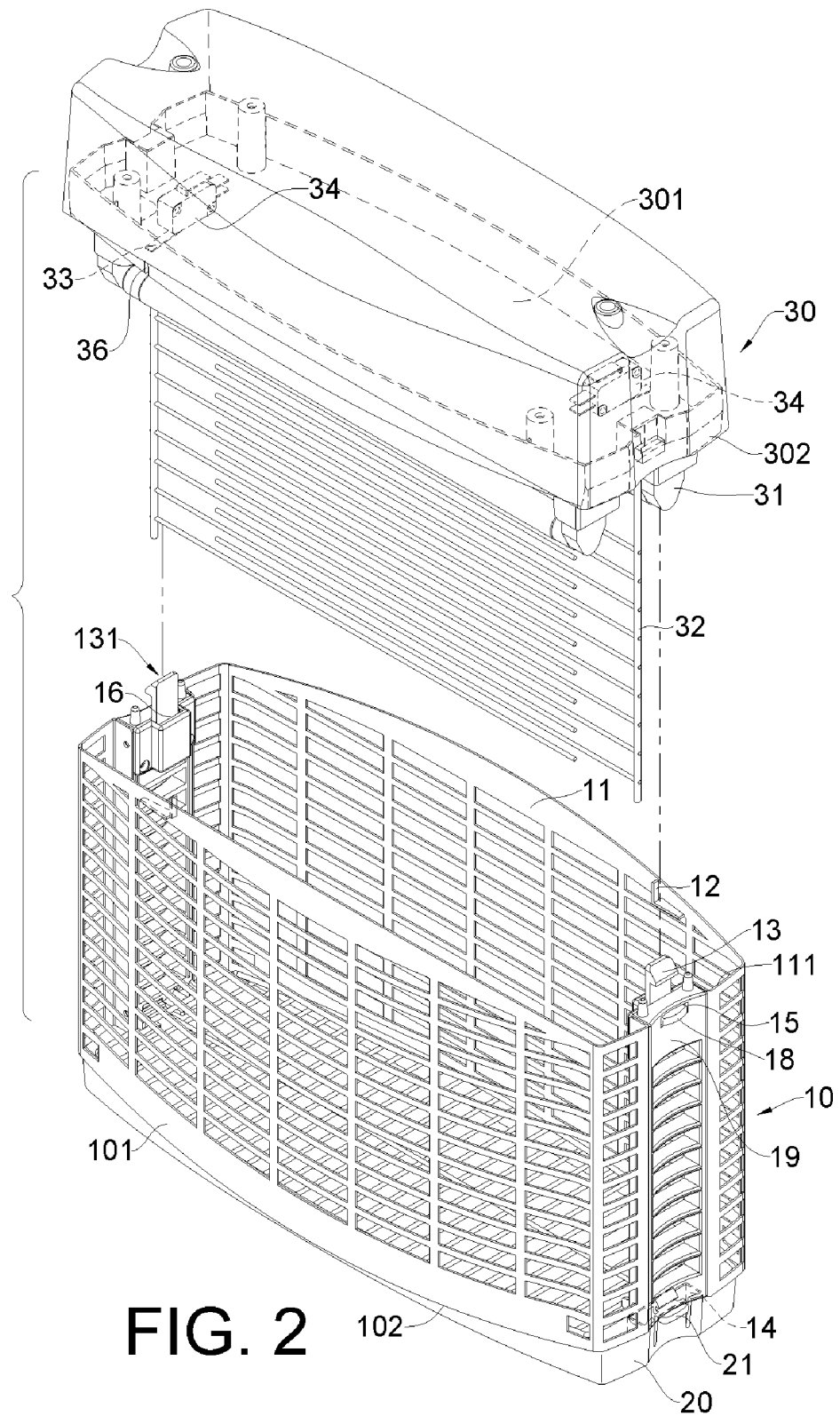
FIG. 2 is a partially exploded perspective view of the insect-catcher in FIG. 1.

With reference to FIGS. 1 and 2, an insect-catcher in accordance with the present invention has a frame (10), a cover (30) and a gathering base (20).

The frame (10) has an open top (11) and a bottom (101).

The open top (11) has an edge (111), two sides (19), at least one first fastener (131) and at least one key (12). At least one of the sides may have a mounting hole (15). The at least one first fastener (131) is mounted on the edge (111) of the open top (11) and each of the at least one first fastener (131) may have a recess (16), a clip (13) and a button (18). The recess (16) is formed in the top of the frame (10) and communicates with the mounting hole (15). The clip (13) is resilient, is mounted in the recess (16), protrudes from the top of the frame (10) and has a hook. The button (18) extends in the mounting hole (15) in one side of the frame (10) to enter the recess (16), contacts the clip (13) and selectively presses against the clip (13). When users press the button (18), the button (18) will press against the clip (13) in the recess (16) and the clip (13) will be moved inward. In an alternative embodiment, each of the at least one first fastener (131) may be a hooked recess defined in the edge (111) of the top. The at least one key (12) is mounted on the edge (111) of the open top (11) and protrudes upward.

The bottom (101) has an edge (102) and at least one first connector (14). The at least one first connector (14) is mounted on the edge (102) of the bottom and each of the at least one first connector (14) may be a hooked recess. The hooked recess is defined in the bottom (101). In an alternative embodiment, each of the at least one first connector (14) may comprise a recess, a clip and a button. The recess is formed in the bottom (101) of the frame (10). The clip is resilient, is mounted in the recess, protrudes from the bottom (101) of the frame (10) and has a hook. The button extends in the mounting hole in one side (19) of the frame (10) to enter the recess, contacts the clip and selectively presses against the clip. When users presses the button, the button will press against the clip in the recess and the clip will be moved inward.

Figure 3:
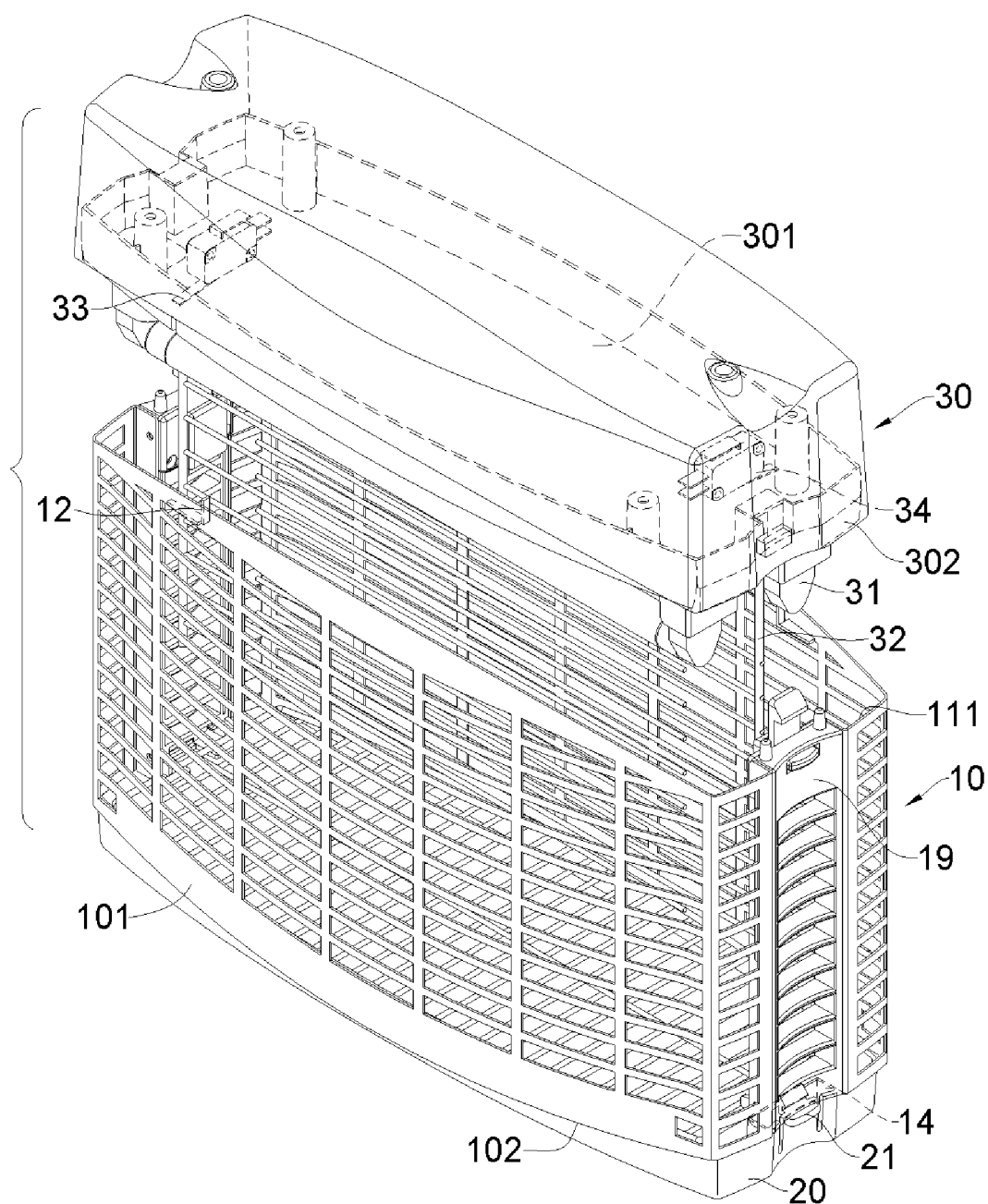
FIG. 3 is a partially exploded perspective view of the insect-catcher in FIG. 2.
Figure 4:
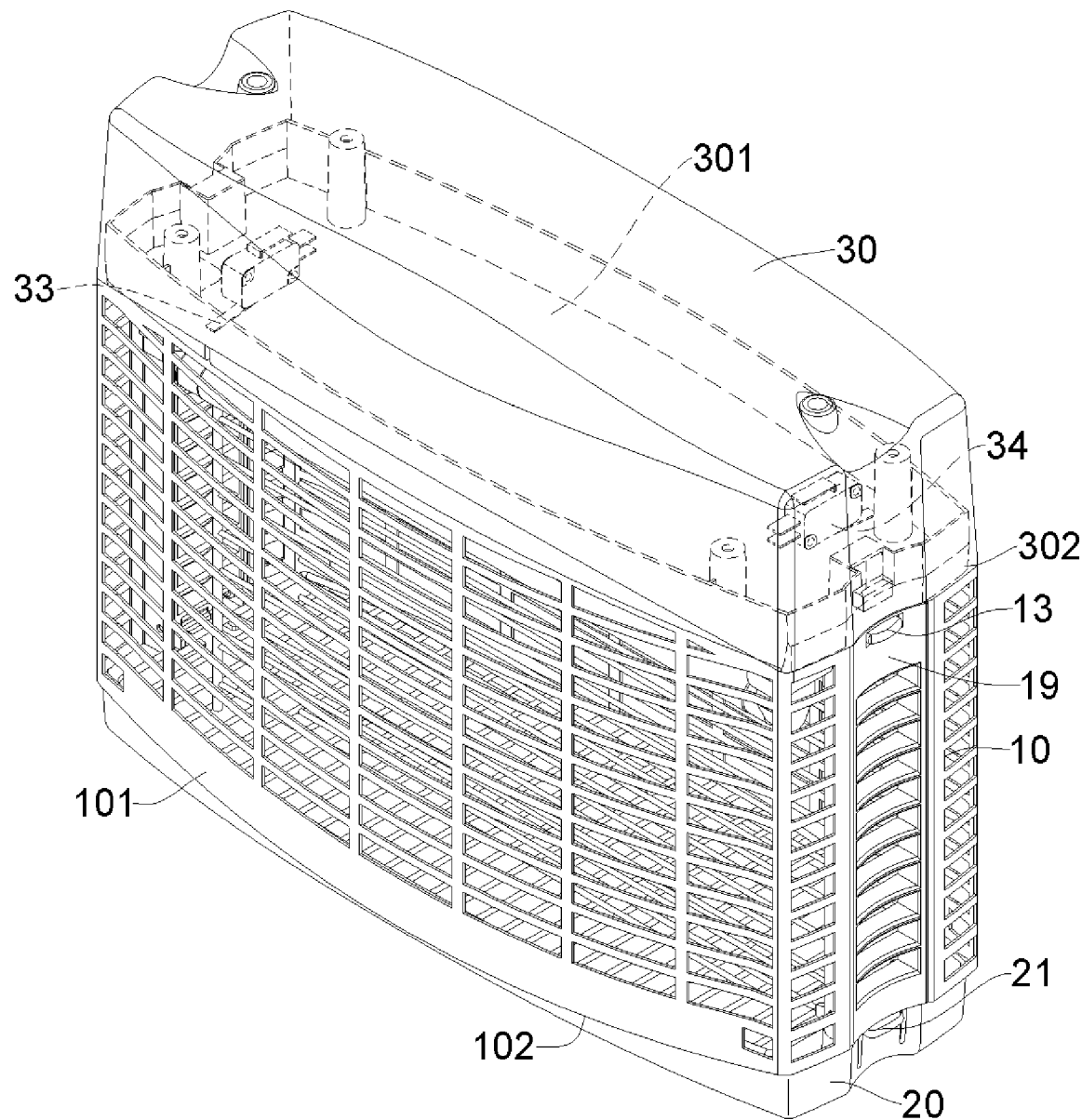
FIG. 4 is a perspective view of the insect-catcher in FIG. 1.

With further reference to FIGS. 3 and 4, the cover (30) detachably covers the top of the frame (10) and has an inner space (301), a bottom (302), two sides, at least one light tube (31), a high-voltage net (32), at least one keyway (36), at least one safety switch (34) and at least one second fastener (35).

At least one of the two sides may have a mounting hole.

The at least one light tube (31) is mounted on the bottom (302) of the cover (30) and is brightened when electrified.

The high-voltage net (32) is mounted on the bottom (302) of the cover (30) and extends in the frame (10) from the open top (11) of the frame (10) to the bottom (101) of the frame (10) and generates high voltage when electrified.

The at least one keyway (36) corresponds to the at least one key (12) of the frame (10), extends in the bottom (302) of the cover (30) and the least one keyway (36) respectively receives the at least one key (12).

The at least one safety switch (34) is mounted in the inner space (301) of the cover (30) and each of the at least one safety switch (34) has an activating lever (33). The activating lever (33) is pivotally mounted on the safety switch (34), aligns with one of the at least one keyway (36) and selectively presses against a corresponding one of the at least one key (12). The activating lever (33) separates from the key (12), the safety switch (34) is turned off and electricity can not enter the high-voltage net (32) when the cover (30) disengages from the frame (10). The activating lever (33) presses against the key (12), the safety switch (34) is turned on and electricity can enter the high-voltage net (32) when the cover (30) is mounted on the frame (10) securely and the key (12) extends through the keyway (36).

The at least one second fastener corresponds respectively to and connects respectively to the at least one first fastener (131) and each of the least one second fastener may be a hooked recess (35). The hooked recess (35) is defined in the bottom (302) of the cover (30) and detachably receives the clip (13) of a corresponding one of the at least one first fastener (131) and hooks the hook of the clip (13) of the corresponding first fastener (131). The hooked recess (35) and the clip (13) separate from each other and the cover (30) is disengaged from the frame (10) when users presses the button (18) of the at least one first fastener (131). In an alternative embodiment, each of the at least one second fastener may have a recess, a clip and a button when the first fastener (131) is a hooked recess. The recess is formed in the bottom (302) of the cover (30). The clip is resilient, is mounted in the recess, protrudes from the bottom of the cover (30), extends in the hooked recess (35) of a corresponding one of the at least one first fastener (131) and has a hook. The button extends in the mounting hole in one side of the cover (30) to enter the recess, contacts the clip (13) and selectively presses against the clip (13). When users presses the button, the button will press against the clip (13) in the recess and the clip (13) will be moved inward and disengage from the hooked recess (35). Therefore, the cover (30) separates from the frame (10).

The gathering base (20) connects detachably to the bottom (101) of the frame (10) to gather remains of insects and has an open top (24), two sides (25) and at least one second connector. The open top has an edge (241). Each of the at least one of the two sides (25) may have a mounting hole. The at least one second connector is mounted on the edge (241) of the open top (24), corresponds respectively to and connects respectively to the at least one first connector and each of the at least one second connector may have a recess (22), a clip (23) and a button (21). The recess (22) is formed in the open top (24) of the gathering base (20). The clip (23) is resilient, is mounted in the recess (22), protrudes from the top of the gathering base (20), extends in the hooked recess (14) of a corresponding one of the first connector and has a hook. The hook hooks the hooked recess (14) of the bottom (101) of the frame (10). The button (21) extends in the mounting hole of one side (25) of the gathering base (20) to enter the recess (22), contacts the clip (23) and selectively presses against the clip (23). When users presses the button (21), the button (21) will press against the clip (23) and the clip (23) will be bent and disengage from the hooked recess (14), so the gathering base (20) separates from the frame (10). In an alternative embodiment, each of the at least one second connector may be a hooked recess if the first connector comprises a recess, a clip and a button. The hooked recess corresponds to and detachably receives the clip of the corresponding first connector and hooks the hook of the clip. The hooked recess and the clip disengage from each other when users press the button of the clip and the cover (30) separates from the frame (10).

The frame (10) and the gathering base (20) can engage with or disengage from each other by the at least one first connector of the frame (10) and the at least one second connector of the base (20) so the gathering base is detachable. The gathering base (20) can disengage from the frame (10) to be clean conveniently. Furthermore, electricity can pass the light tube (31) and the high-voltage net (32) only when the cover (30) securely covers the frame (10) and the key (12) extends through the keyway (36) to press against one of the activating lever (33) and allow the activating lever (33) moves to turn on the safety switch (34). Thus, when the cover (30) disengages from and the frame (10), electricity does not pass the high-voltage net (32) and users will not get hurt.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An insect-catcher having:
   a frame having
      an open top having
         an edge;
         at least one first fastener mounted on the edge of the open top; and
         at least one key mounted on the edge of the open top and protruding upward;
      a bottom having
         an edge; and
         at least one first connector mounted on the edge of the bottom;
   a cover detachably covering the top of the frame and having
      an inner space;
      a bottom;
      at least one light tube mounted on the bottom of the cover;
      a high-voltage net mounted on the bottom of the cover and extending in the frame from the open top of the frame to the bottom of the frame;
      at least one keyway corresponding respectively to the at least one key of the frame, defined in the bottom of the cover and respectively receiving the at least one key;
      at least one safety switch mounted in the inner space of the cover and each of the at least one safety switch having an activating lever mounted on the safety switch and selectively pressing against a corresponding one of the at least one key;
      at least one second fastener corresponding respectively to and connecting respectively to the at least one first fastener;
   a gathering base detachably connecting to the bottom of the frame and having
      an open top having an edge; and at least one second connector mounted on the edge of the top and corresponding respectively to and connecting respectively to the first connector of the frame.

2. The insect-catcher as claimed in claim 1, wherein:

the frame has two sides and at least one of the sides has a mounting hole;

each one of the at least one first fastener of the frame has
- a recess formed in the top of the frame and near a corresponding mounting hole;
- a clip being resilient, mounted in the recess, protruding from the top of the frame and having a hook;
- a button extending in the corresponding mounting hole in the frame to enter the recess, contacting the clip and selectively pressing against the clip;

each one of the at least one second fastener of the cover has
- a hooked recess detachably receiving the clip of a corresponding one of the at least one first fastener and hooking the hook of the clip of the corresponding first fastener.

3. The insect-catcher as claimed in claim 1, wherein:

the frame has two sides and at least one of the sides has a mounting hole;

each one of the at least one first connector has a hooked recess defined in the edge of the bottom of the frame;

the gathering base further has two sides and at least one of the sides has a mounting hole;

each one of the at least one second connector has
- a recess formed in the top of the gathering base;
- a clip being resilient, mounted in the recess, protruding from the top of the gathering base, extending in the hooked recess of a corresponding one of the at least one first connector and having a hook hooking the hooked recess of the corresponding first connector in the bottom of the frame;
- a button extending in a corresponding mounting hole in the gathering base to enter the recess and selectively pressing against the clip.

* * * * *